United States Patent
Lee et al.

(10) Patent No.: US 10,075,082 B2
(45) Date of Patent: Sep. 11, 2018

(54) SWITCHING MODE POWER SUPPLIES WITH FAST LOAD-TRANSIENT RESPONSE

(71) Applicant: Leadtrend Technology Corporation, Zhubei, Hsinchu County (TW)

(72) Inventors: Ching-Tsan Lee, Zhubei (TW); Chung-Wei Lin, Zhubei (TW); Yang-Sheng Lin, Zhubei (TW)

(73) Assignee: LEADTREND TECHNOLOGY CORPORATION, Zhubei, Hsinchu County (TW)

( * ) Notice: Subject to any disclaimer, the term of this patent is extended or adjusted under 35 U.S.C. 154(b) by 0 days.

(21) Appl. No.: 15/361,103

(22) Filed: Nov. 25, 2016

(65) Prior Publication Data

US 2017/0155331 A1  Jun. 1, 2017

(30) Foreign Application Priority Data

Nov. 27, 2015  (TW) .............................. 104139538 A (51) Int. Cl.
*H02M 3/335* (2006.01)
*H02M 1/00* (2006.01)
*H02M 3/156* (2006.01)

(52) U.S. Cl.
CPC ................. *H02M 3/33523* (2013.01); *H02M 2001/0032* (2013.01); *H02M 2003/1566* (2013.01)

(58) Field of Classification Search
CPC . H02M 2001/0032; H02M 2001/0035; H02M 3/33507; H02M 3/33523
See application file for complete search history.

(56) References Cited

U.S. PATENT DOCUMENTS

| | | | |
|---|---|---|---|
| 2013/0155728 A1* | 6/2013 | Melanson | H02M 1/44 363/21.16 |
| 2014/0036549 A1* | 2/2014 | Li | H02M 3/33507 363/21.12 |
| 2014/0268923 A1* | 9/2014 | Valley | H02M 3/33523 363/21.17 |
| 2016/0172985 A1* | 6/2016 | Arima | H02M 3/33507 363/21.16 |

\* cited by examiner

*Primary Examiner* — Nguyen Tran
*Assistant Examiner* — Lakaisha Jackson
(74) *Attorney, Agent, or Firm* — McClure, Qualey & Rodack, LLP (57) ABSTRACT

A power supply detects a falling rate of an output voltage for fast load-transient response. The power supply with a primary side and a secondary side isolated from each other comprises a primary-side control circuit and a secondary-side control circuit. The primary-side control circuit controls a power switch to convert an input power source on the primary side into an output power source on the secondary side. The output power source has the output voltage. The secondary-side control circuit detects the falling rate and sending information to the primary-side control circuit when the falling rate exceeds a predetermined rate. In response to the information, the primary-side control circuit starts anew switching cycle of the power switch.

17 Claims, 7 Drawing Sheets

SWITCHING MODE POWER SUPPLIES WITH FAST LOAD-TRANSIENT RESPONSE

CROSS-REFERENCE TO RELATED APPLICATION

This application claims priority to and the benefit of Taiwan Application Series Number 104139538 filed on Nov. 27, 2015, which is incorporated by reference in its entirety.

BACKGROUND

The present disclosure relates generally to switching-mode power supply (SMPS), and more particularly to SMPSs using primary side control.

Most of electronics appliances require power supplies, which provide output power sources with specific output ratings. For example, an AC-to-DC power supply could convert a mains alternating-current (AC) power into a direct-current (DC) output power source whose output voltage and current are well controlled. Among the power supplies in the art, SMPS is known to have compact size and excellent conversion efficiency, and is popularly adopted in the art.

To prevent users from high-voltage stress or shock from a mains AC power source, a power supply could be designed to have two sides galvanically isolated from each other, meaning there is no direct current flowing between the two sides. One side directly connected to the mains AC power source is generally referred to as a primary side and the other as a secondary side. The voltages on the primary side all reference to an input ground of the mains AC power source while those on the secondary side all reference to a floating ground on the secondary side.

A SMPS with galvanical isolation could provide a pulse-width-modulation (PWM) signal to control a power switch, so as to constrain the electric power transferred from the primary side to the secondary side, and to make an output power source on the secondary side fit all required output ratings. For instance, one output rating requires the output voltage of the output power source to be regulated to be about 5V within a certain tolerance range all the time. The tolerance range is from a bottom limit to a top limit, or from 4.8V to 5.2V for example.

Two kinds of voltage control methodology for SMPS are known in the art; one is called primary side control (PSC), the other secondary side control (SSC). Operating under PSC, Circuitry on the primary side senses a reflective voltage of an inductive device to generate a PWM signal for a power switch while the reflective voltage represents an output voltage on the secondary side. PSC has the circuitry on the primary side indirectly sensing the output voltage. Nevertheless, SSC uses circuitry on the secondary side to directly sense the output voltage and to send information, via a photo coupler for example, to the primary side.

To reduce switching loss of a power switch, the switching frequency of a PWM signal controlling the power switch is intentionally reduced to be very low when a load of a SMPS is light or absent. In other words, during the condition of light load or no load, the ON time $T_{ON}$ of the power switch when it is turned ON to conduct current is brief, and the OFF time $T_{OFF}$ of the power switch when it is turned OFF lasts for along time. It is always a challenge to keep the output voltage from falling and to stay within the tolerance range when the light load or no load of a SMPS suddenly turns into a heavy load, however. More particularly, a SMPS with PSC, when its load is light or absent, cannot acknowledge the variation of its output voltage most of time because the reflective voltage only exists briefly when the inductive device of the SMPS is de-energizing. It is an important task to make a SMPS respond fast to the output voltage transient, or the output voltage might drop down below the bottom limit of the tolerance range, one of the output ratings of the SMPS.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
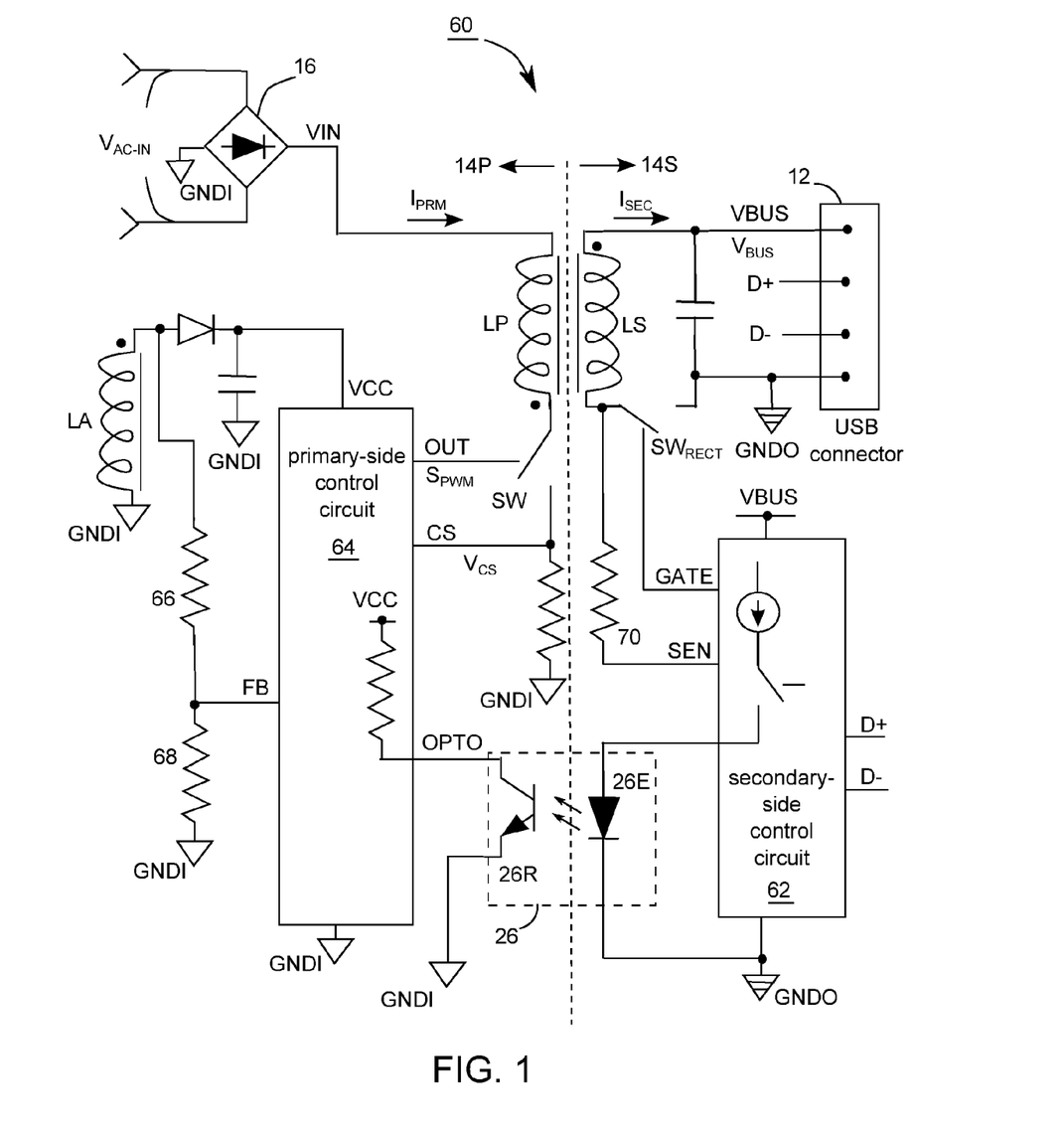
FIG. 1 shows a charger according to embodiments of the invention.

FIG. 1 shows a charger 60 according to embodiments of the invention, which is a SMPS, capable of charging an electronic appliance connected to the universal serial bus (USB) connector 12. In consideration of safety, the charger 60 has a primary side 14P and a secondary side 14S galvanically isolated from each other. There is no direct-current connection between the primary side 14P and the secondary side 14S. The circuits on the primary side 14P, including a primary-side control circuit 64, all are powered by an input power source VIN and an input ground GNDI, both of which are generated by rectifying a mains alternating-current (AC) voltage $V_{AC-IN}$. The de-energizing of a secondary winding LS could build up on the secondary side 14S an output power source VBUS and an output ground GNDO to power the circuits on the secondary side 14S, including a secondary-side control circuit 62 and a load connected to the USB connector 12.

A primary winding LP and an auxiliary winding LA are on the primary side 14P, while the secondary winding LS is on the secondary side 14S. Via a power switch SW, the primary-side control circuit 64 controls the current $I_{PRM}$ flowing through the primary winding LP, so the input power source VIN could energize the transformer including the primary winding LP, the auxiliary winding LA, and the secondary winding LS. When the power switch PW is OFF, the transformer de-energizes to build up the output power source VBUS on the secondary side 14S.

The primary-side control circuit 64 senses a voltage drop across the auxiliary winding LS via the node FB, a joint between resistors 66 and 68, and this voltage drop could be a reflective voltage representing the output voltage $V_{BUS}$ of the output power source VBUS. In other words, the primary-side control circuit 64 could detect the output voltage $V_{BUS}$ indirectly via the node FB and the auxiliary winding LA. Based upon the detection result from the node FB, the primary-side control circuit 64 modulates the switching frequency $f_{SW}$ and/or the duty cycle of the PWM signal $S_{PWM}$ to control the power conversion of the transformer in FIG. 1 and to regulate the output voltage $V_{BUS}$. This kind of control methodology is commonly referred to PSC. For example, if the detection result from the node FB indicates the output voltage $V_{BUS}$ is slightly higher than a target value $V_{TRGT}$, then the primary-side control circuit 64 reduces the switching frequency $f_{SW}$ and/or the duty cycle of the PWM signal $S_{PWM}$, so less power is then converted from the primary side 14P to the secondary side 14S, and the output voltage $V_{BUS}$ could ramp down to approach the target value $V_{TRGT}$.

The secondary-side control circuit 62, which in FIG. 1 is a synchronous rectification controller as well, controls a rectification switch $SW_{RECT}$. The secondary-side control circuit 62 could detect via the resistor 70 the condition of the power switch SW to know whether the power switch SW is ON or OFF, so acknowledges the switching frequency $f_{SW}$ of the PWM signal $S_{PWM}$.

The secondary-side control circuit 62 sends, by way of a photo coupler 26 including an emitter 26E and a receiver 26R, information from the secondary side 14S to the primary side 14P. This information could be digital or analog. For example, if it is digital, this information might be just one bit, or in the form of a data code consisting of several bits. If it is analog, this information might be the duty cycle of the emitter 26E emitting light, which induces an analog voltage level at a receiving node OPTO. Based upon the voltage variation at the receiving node OPTO, the primary-side control circuit 64 could receive and interpret the information sent from the secondary-side control circuit 62 so as to react accordingly. In this embodiment, the photo coupler 26 acts to provide a message channel from the secondary side 14S to the primary side 14P, but this invention is not limited to, however. Other embodiments of the invention might use other device capable of providing galvanic isolation to provide a message channel between the primary side 14P and the secondary side 14S. A pulse transformer or a capacitor, for instance, could function as a message channel between the primary side 14P and the secondary side 14S in some embodiments of the invention. In one embodiment of the invention, the primary-side control circuit 64, if the power switch SW is not being turned ON, fast starts a new switching cycle when detecting a voltage drop at the receiving node OPTO.

One embodiment of this invention considers the falling rate $RA_{DROP}$ of the output voltage $V_{BUS}$ exceeding a predetermined rate as an indication of the occurrence of a heavy load on the secondary side 14S. In FIG. 1, the secondary-side control circuit 62, when deeming the load connected to the USB connector 12 as being light or absent, detects the falling rate $RA_{DROP}$ of the output voltage $V_{BUS}$. In case that the falling rate $RA_{DROP}$ exceeds the predetermined rate, 0.2V/ms for instance, the load connected to the USB connector 12 (not shown in FIG. 1) seems to suddenly turn into a heavy load. Accordingly, the secondary-side control circuit 62 quickly informs via the photo coupler 26 the primary-side control circuit 64. For example, upon the detection of the falling rate DROP exceeding the predetermined rate, the secondary-side control circuit drives the emitter 26E to emit light, causing a voltage drop at the receiving node OPTO. Once it finds the voltage drop at the receiving node OPTO, the primary-side control circuit 64 fast starts a new switching cycle of the power switch with a brief ON time $T_{ON}$. As the transformer (including the primary side LP, the secondary side LS, and the auxiliary side LA) energizes and de-energizes during the new switching cycle, the primary-side control circuit 64 is capable of acknowledge the present value of the output voltage $V_{BUS}$ to accordingly modulate the switching frequency $f_{SW}$ and/or the duty cycle of the PWM signal $S_{PWM}$ and to fast recover the output voltage $V_{BUT}$ from falling. The primary-side control circuit 64 therefore responds fast to the voltage transient of the output voltage $V_{BUS}$ or the charger 60 has fast load-transient response.

Figure 2A:
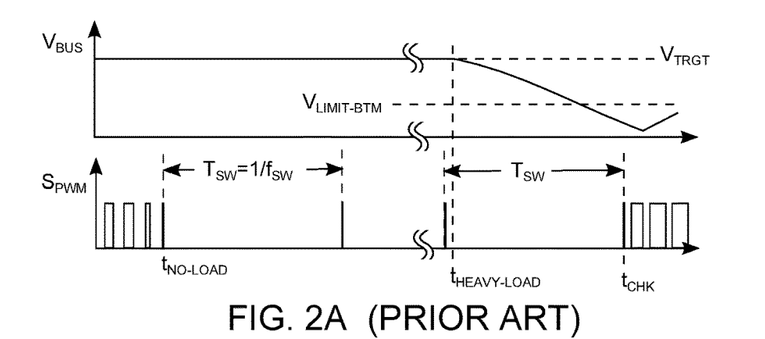
FIG. 2A demonstrates fictitious signal waveforms in FIG. 1 without the help of the fast load-transient response provided by the invention.
Figure 2B:
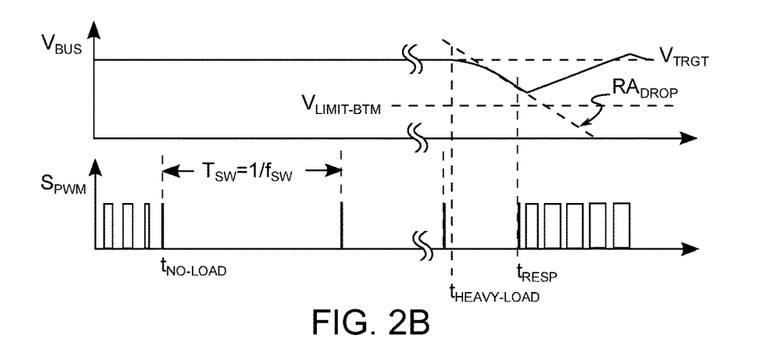
FIG. 2B demonstrates signal waveforms in FIG. 1 with the help of the fast load-transient response.

FIG. 2A demonstrates fictitious signal waveforms in FIG. 1 without the help of the fast load-transient response provided by the invention, while FIG. 2B, as a comparison, demonstrates signal waveforms in FIG. 1 with the help of the fast load-transient response. The load becomes no load at the moment $t_{NO-LOAD}$ for both FIGS. 2A and 2B, so the switching frequency $f_{SW}$ and the duty cycle of the PWM signal $S_{PWM}$ both reduce to be very low to stabilize the output voltage $V_{BUS}$ at about the target value $V_{TRGT}$. For both FIGS. 2A and 2B, the moment $t_{HEAVY-LOAD}$ when the load suddenly turns into a heavy load occurs not far away behind the end of a pulse of the PWM signal $S_{PWM}$, and the output voltage $V_{BUS}$ starts falling rapidly since no power is being transferred from the primary side 14P to the secondary side 14S.

In FIG. 2A, without any information from the secondary side 14S at the time around the moment $t_{HEAVY-LOAD}$, the primary side 14P is still remembering the load as no load, so the switching frequency $f_{SW}$ of the PWM signal $S_{PWM}$ is kept low, and the next pulse of the PWM signal $S_{PWM}$ after the moment $t_{HEAVY-LOAD}$ is generated as late as the end of the cycle time $T_{SW}$ ($=1/f_{SW}$), which is denoted as the moment $t_{CHK}$ in FIG. 2A. At the moment $t_{CHK}$, a new switching cycle starts, the transformer energizes and de-energizes, the primary side 14P acknowledges the output voltage $V_{BUS}$ falling away from the target value $V_{TRGT}$, and both the switching frequency $f_{SW}$ and the duty cycle of the PWM signal $S_{PWM}$ increase, trying to ramp up the output voltage $V_{BUS}$, as shown in FIG. 2A. However, the output voltage $V_{BUS}$ could be below the bottom limit $V_{LIMIT-BTM}$, or out of the tolerance range, and this result is unacceptable.

Please refer to both FIGS. 1 and 2B. When the load is a light load or no load, the secondary-side control circuit 62 detects the falling rate $RA_{DROP}$ of the output voltage $V_{BUS}$, which is defined as the decrement of the output voltage $V_{BUS}$ per time unit and is equal to the slope of the waveform of the output voltage $V_{BUS}$ in FIG. 2B. At the moment $t_{RESP}$ in FIG. 2B, the secondary-side control circuit 62 finds the falling rate $RA_{DROP}$ exceeding the predetermined rate, so the secondary-side control circuit 62 urgently signals the primary-side control circuit 64, which in response fast starts a new switching cycle by providing a pulse to the PWM signal $S_{PWM}$. During a period of de-energizing in this new switching cycle, the primary-side control circuit 64 can find the output voltage $V_{BUS}$ falling away from the target value $V_{TRGT}$, so both the switching frequency $f_{SW}$ and the duty cycle of the PWM signal $S_{PWM}$ increase for the subsequent switching cycles, as shown in FIG. 2B. In view of the comparison between FIGS. 2A and 2B, the output voltage $V_{BUS}$ in FIG. 2B is much more stable, less likely drops below the bottom limit $V_{LIMIT-BTM}$, and goes back more quickly to the target value $V_{TRGT}$.

Figure 3A:
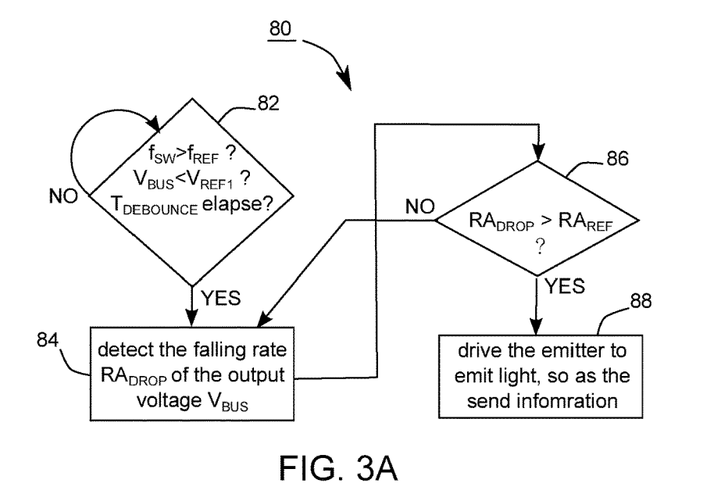
FIG. 3A shows a control method suitable to be used in a secondary-side control circuit according to embodiments of the invention.

FIG. 3A shows a control method 80 suitable to be used in the secondary-side control circuit 62 according to embodiments of the invention. Step 82 asks three inquiries: 1) whether the switching frequency $f_{SW}$ is below a predetermined frequency $f_{REF}$, 10 khz for example; 2) whether the output voltage is below a predetermined value $V_{REF1}$, 5V for example; and 3) whether a debounce time $T_{DEBOUNCE}$ has elapsed. Accordingly to one embodiment of the invention, if any one of the three inquiries receives a negative answer then step 82 repeats, and only if each of the three inquiries obtains a positive answer then step 84 proceeds to detect the falling rate DROP of the output voltage $V_{BUS}$. Following step 84, step 86 checks if the falling rate $RA_{DROP}$ exceeds a predetermined rate $RA_{REF}$. A negative answer from the step 86 causes the control method 80 back to step 84, continuing the detection of the falling rate DROP. If the step 86 generates a positive answer, step 88 follows, the secondary-side control circuit 62 driving the emitter 26E to emit light, so as to send information to the primary-side control circuit 64, which in response urgently starts a new switching cycle.

Figure 3B:
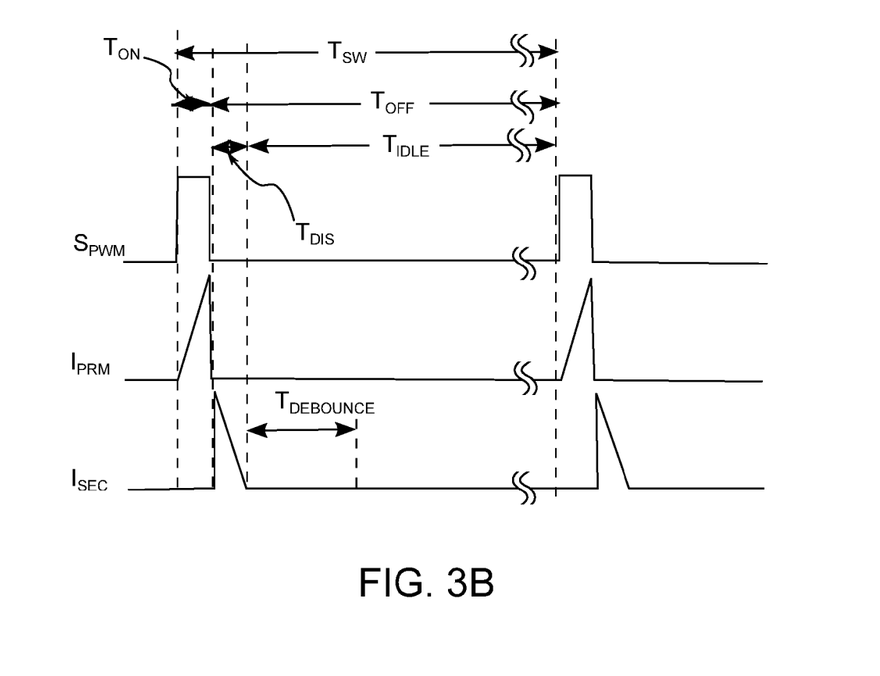
FIG. 3B shows the definition of the debounce time $T_{DEBOUNCE}$.

A positive answer of the first inquiry in the step 82 implies the switching frequency $f_{SW}$ could be too low to respond to the transient of the output voltage $V_{BUS}$. The answer of the first inquiry can be found out by checking if the cycle time $T_{CYC}$ (=$1/f_{SW}$) of the current switching cycle exceeds a predetermined time period. A positive answer of the second inquiry in the step 82 means the output voltage $V_{BUS}$ is so low that it could easily fall below the bottom limit $V_{LIMIT-BTM}$ As to the third inquiry in the step 82, FIG. 3B shows the definition of the debounce time $T_{DEBOUNCE}$, which is a predetermined period of time right after the end of a de-energizing time $T_{DIS}$. In FIG. 3B, a cycle time $T_{CYC}$ consists of an ON time $T_{ON}$ and an OFF time $T_{OFF}$. An ON time $T_{ON}$ is the duration when the power switch SW is turned ON, and an OFF time $T_{OFF}$ is the duration when it is turned OFF. An OFF time $T_{OFF}$ in FIG. 3B is split in two parts: one is a de-energizing time $T_{DIS}$ when the winding current $I_{SEC}$ of the secondary winding LS (shown in FIG. 1) exceeds 0 A, and the other an idle time $T_{IDLE}$ when the winding current $I_{SEC}$ is about 0 A. During a de-energizing time $T_{DIS}$ the secondary winding LS releases its stored energy. As shown in FIG. 3B, the debounce time $T_{DEBOUNCE}$ starts at the same time when the idle time $T_{IDLE}$ starts. The step 84 of the control method 80 detects the falling rate $RA_{DROP}$ during the idle time $T_{IDLE}$ but after the debounce time $T_{DEBOUNCE}$, so as to avoid voltage instability caused by the de-energizing of the secondary winding LS, and to obtain the falling rate $RA_{DROP}$ solely caused by a load.

Figure 4:
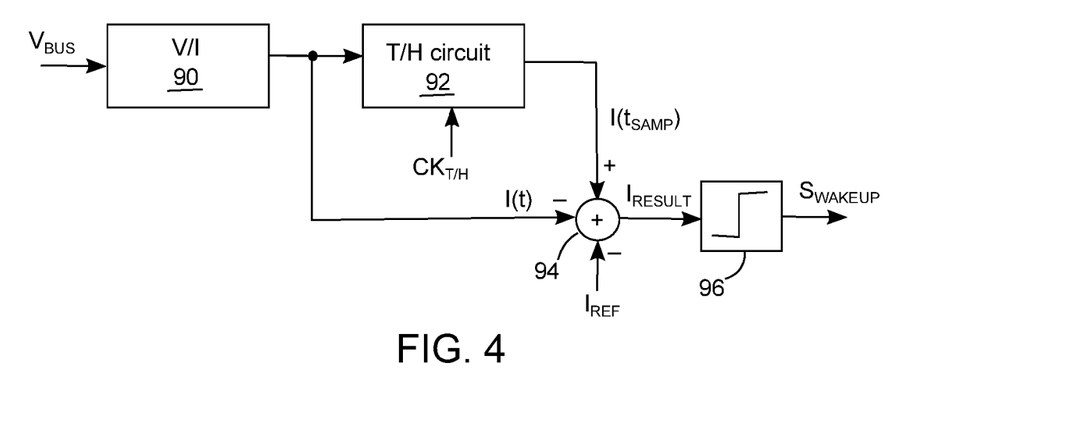
FIG. 4 is a circuit block diagram showing how to detect the falling rate $RA_{DROP}$ exceeding the predetermined rate $RA_{REF}$.

FIG. 4 is a circuit block diagram showing how to detect the falling rate $RA_{DROP}$ exceeding the predetermined rate $RA_{REF}$ A voltage-to-current converter 90 tracks the output voltage $V_{BUS}$ to provide a corresponding current $I(t)$ whose value is about $K*(V_{BUS}-V_{REF})$ where K is a constant and $V_{REF}$ is a reference voltage. The corresponding current $I(t)$ is a function of the output voltage $V_{BUS}$, and therefore represents the output voltage $V_{BUS}$. A track-and-hold circuit 92 is controlled by a track/hold clock $CK_{T/H}$, and tracks the corresponding current $I(t)$ to hold a sample current $I(t_{SAMP})$, the corresponding current $I(t)$ at the moment $t_{SAMP}$ The track/hold clock $CK_{T/H}$ could be generated internally inside the secondary-side control circuit 62, and have a frequency as high as 100 kHz, for example. The track/hold clock $CK_{T/H}$ can define a hold time $T_{HOLD}$ when the sample current $I(t_{SAMP})$ remains unchanged as being isolated from the corresponding current $I(t)$. The moment $t_{SAMP}$ is the beginning of the hold time $T_{HOLD}$, and the sample current $I(t_{SAMP})$ equals to the corresponding current $I(t)$ at the moment $t_{SAMP}$. The sample current $I(t_{SAMP})$ seems to represent the output voltage $V_{BUS}$ at the moment $t_{SAMP}$, denoted as $V_{BUS}(t_{SAMP})$ hereinafter. In one embodiment of the invention, the sample current $I(t_{SAMP})$ is about $K*(V_{BUS}(t_{SAMP})-V_{REF})$. An adder 94 deducts from the sample current $I(t_{SAMP})$ the corresponding current $I(t)$ and a constant reference current $I_{REF}$ (2 uA for example) to generate a result current $I_{RESULT}$. During the hold time $T_{HOLD}$ defined by the track/hold clock $CK_{T/H}$, if the result current $I_{RESULT}$ is negative, then the decider 96 de-asserts the wakeup signal $S_{WAKEUP}$. In the opposite, if the result current $I_{RESULT}$ is positive, then the decider 96 asserts the wakeup signal $S_{WAKEUP}$ to urgently make the emitter 26E illuminate, so that information is transferred to the primary-side control circuit 64 to start a new switching cycle.

According to the aforementioned teaching, the wakeup signal $S_{WAKEUP}$ is asserted if the function (1) shown below meets.

$$I(t_{SAMP})-I(t)-I_{REF}>0 \qquad (1).$$

The function (1) could turn out the function (2) if the sample current $I(t_{SAMP})$ and the corresponding current $I(t)$ are expressed by $V_{BUS}(t_{SAMP})$ and the output voltage $V_{BUS}$.

$$K*[V_{BUS}(t_{SAMP})-V_{REF}]-K*[V_{BUS}-V_{REF}]-I_{REF}>0;$$

$$V_{BUS}(t_{SAMP})-V_{BUS}>I_{REF}/K \qquad (2).$$

The function (2) implies that the wakeup signal $S_{WAKEUP}$ is asserted if, within the hold time $T_{HOLD}$, the output voltage $V_{BUS}$ decreases by more than $I_{REF}/K$. The falling rate DROP when the hold time $T_{HOLD}$ ends can be expressed as $(V_{BUS}(t_{SAMP})-V_{BUS})/T_{HOLD}$, and the function (2) becomes the function (3) shown below.

$$RA_{DROP}=(V_{BUS}(t_{SAMP})-V_{BUS})/T_{HOLD}>I_{REF}/(K*T_{HOLD})=RA_{REF} \qquad (3).$$

The circuit block diagram shown in FIG. 4, based on the function (3), can detect whether the falling rate $RA_{DROP}$ exceeds the predetermined rate $RA_{REF}$. The equation (3) lacks the reference voltage $V_{REF}$, which is used from converting the output voltage $V_{BUS}$ into the corresponding current $I(t)$, meaning the reference voltage $V_{REF}$ can be arbitrarily selected.

Please refer to FIGS. 3A, 3B and 4. In one embodiment, as the falling rate $RA_{DROP}$ is checked whether it exceeds the predetermined rate $RA_{REF}$ only when the three inquiries in the step 82 are answered positively, the hold time $T_{HOLD}$ is within the idle time $T_{IDLE}$ but after the debounce time $T_{DEBOUNCE}$.

Figure 5:
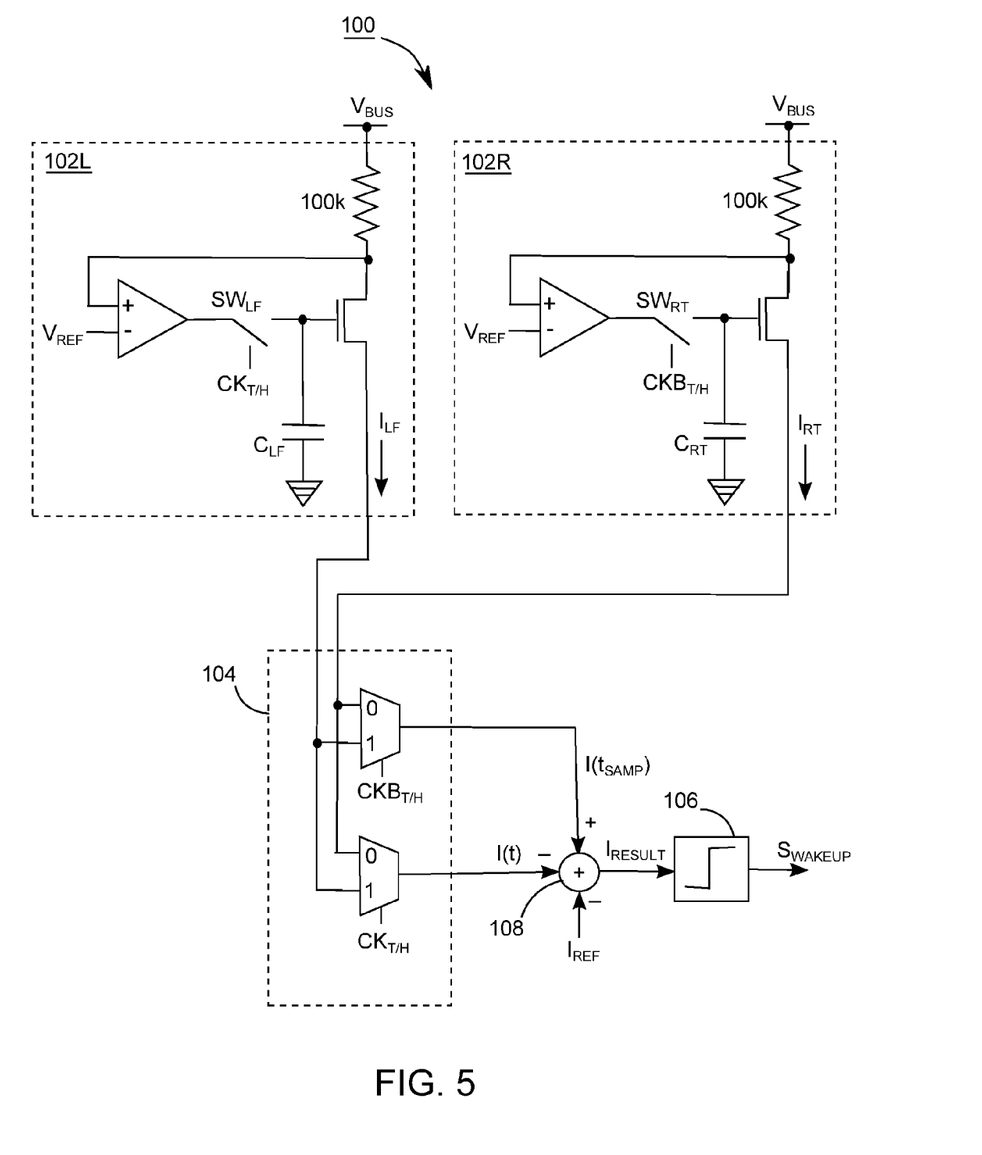
FIG. 5 demonstrates a falling-rate detector for detecting whether the falling rate $RA_{DROP}$ of the output voltage $V_{BUS}$ exceeds the predetermined rate $RA_{REF}$.

FIG. 5 demonstrates a falling-rate detector 100 for detecting whether the falling rate $RA_{DROP}$ of the output voltage $V_{BUS}$ exceeds the predetermined rate $RA_{REF}$. In one embodiment of the invention, the falling-rate detector 100 is implemented inside the secondary-side control circuit 62. FIG. 5 has two voltage-to-current converters 102L and 102R substantially identical to each other, but the switch $SW_{LF}$ is controlled by the track/hold clock $CK_{T/H}$ while the switch $SW_{RF}$ by the inverted track/hold clock $CKB_{T/H}$, which is the inverse of the track/hold clock $CK_{T/H}$. Take the voltage-to-current converter 102L for example, it tracks the output voltage $V_{BUS}$ to generate current $I_{LF}$ when the switch $SW_{LF}$ conducts, where the current $I_{LF}$ is about $(V_{BUS}-V_{REF})/100$ k. When the switch $SW_{LF}$ does not conduct, however, the voltage-to-current converter 102L becomes a recorder using the capacitor $C_{LF}$ to record a gate voltage, and the current $I_{LF}$ is held to be about $(V_{BUS}(t_{SAMP})-V_{REF})/100$ k, where the moment $t_{SAMP}$ is the moment when the switch $SW_{LF}$ switches from conducting to non-conducting. A multiplexer 104, depending on the logic value of the track/hold clock $CK_{T/H}$, duplicates one of the currents $I_{LF}$ and $I_{RF}$ to be the corresponding current I(t), and the other to be the sample current $I(t_{SAMP})$. In one perspective, the voltage-to-current converters 102L and 102R alternate in tracking the output voltage $V_{BUS}$ to provide the corresponding current I(t), while the one not tracking holds the sample current $I(t_{SAMP})$. The adder 108 and the decider 106 in FIG. 5 could be identical to or similar with the adder 94 and the decider 96 in FIG. 4 respectively. The duration when the track/hold clock $CK_{T/H}$ is asserted is a kind of hold time $T_{HOLD}$, during which the current $I_{RF}$ is held unchanged. The duration when the inverted track/hold clock $CKB_{T/H}$ is asserted is another hold time $T_{HOLD}$, during which the current $I_{LF}$ is held unchanged. According to the aforementioned teaching regarding to FIG. 4, the falling-rate detector 100 in FIG. 5 is capable of detecting whether the falling rate $RA_{DROP}$ of the output voltage $V_{BUS}$ exceeds the predetermined rate $RA_{REF}$.

Figure 6:
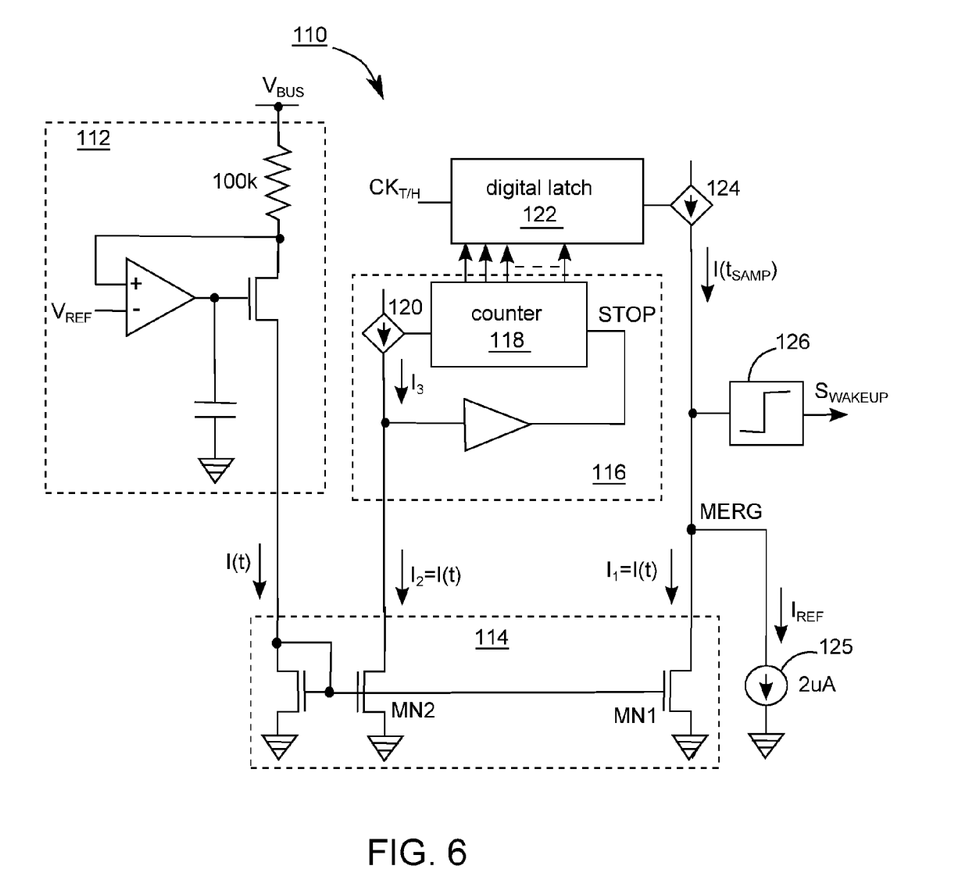
FIGS. 6-8 demonstrate three falling-rate detectors according to embodiments of the invention.

FIG. 6 demonstrates another falling-rate detector 110, suitable for being implemented inside the secondary-side control circuit 62 in embodiments of the invention, and capable of detecting whether the falling rate $RA_{DROP}$ of the output voltage $V_{BUS}$ exceeds the predetermined rate $RA_{REF}$. The voltage-to-current converter 112 converts the output voltage $V_{BUS}$ into a corresponding current I(t) fed to a current mirror 114, which in response generates corresponding currents $I_1$ and $I_2$ by NMOS transistors MN2 and MN1 respectively. It is supposed that the corresponding currents $I_1$ and $I_2$ are the same in value with the corresponding current I(t), which is about $(V_{BUS}-V_{REF})/100$ k. An analog-to-digital converter 116 tracks the corresponding current $I_2$, by comparing the corresponding current $I_2$ with a current $I_3$ to make a counter 118 increase or decrease its count, which eventually makes the current $I_3$ from the current generator 120 substantially equal to the corresponding current $I_2$. In other words, the analog-to-digital converter 116 converts the corresponding current $I_1$ into the count of the counter 118, a digital signal. A digital latch 122 latches to record the count of the counter 118 when the track/hold clock $CK_{T/H}$ toggles, and what the digital latch 122 records controls the current generator 124 to generate a sample current $I(t_{SAMP})$, where the moment $t_{SAMP}$ is the moment when the track/hold clock $CK_{T/H}$ toggles. The sample current $I(t_{SAMP})$ pours into a node MERG and both the corresponding current $I_1$ and the constant reference current $I_{REF}$, drain away from the node MERG. When the node MERG has a voltage exceeding a predetermined high level, it implies the sample current $I(t_{SAMP})$ is more than the summation of the corresponding current I(t) and the reference current $I_{REF}$, and the decider 126 asserts the wakeup signal $S_{WAKEUP}$. In the opposite, if the node MERG has a voltage below a predetermined low level, which could be the same as the predetermined high level, the decider 126 de-asserts the wakeup signal $S_{WAKEUP}$. The sample current $I(t_{SAMP})$ is checked by the decider 126 to determine whether it exceeds the summation of the corresponding current I(t) and the reference current $I_{REF}$. An asserted wakeup signal $S_{WAKEUP}$ can cause the emitter 26E immediately emitting light to transmit information to the primary-side control circuit 64, which in response starts a new switching cycle as soon as possible. According to the aforementioned teaching regarding to FIG. 4, the falling-rate detector 110 in FIG. 6 is capable of detecting whether the falling rate $RA_{DROP}$ of the output voltage $V_{BUS}$ exceeds the predetermined rate $RA_{REF}$.

Figure 7:
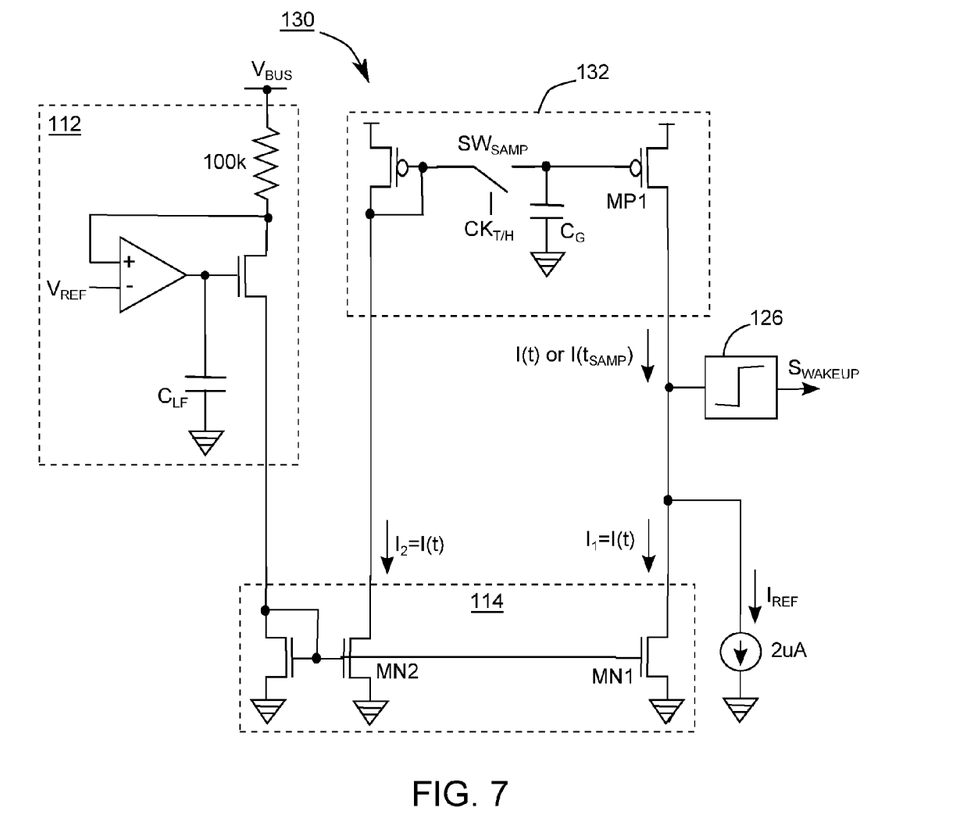

FIG. 7 demonstrates another falling-rate detector 130, suitable for being implemented inside the secondary-side control circuit 62 in embodiments of the invention, and capable of detecting whether the falling rate $RA_{DROP}$ of the output voltage $V_{BUS}$ exceeds the predetermined rate $RA_{REF}$. Some elements or circuits in FIG. 7 are not detailed herein because they are the same as or similar with some elements or circuits in FIG. 6 and could be understandable based on the aforementioned teaching. FIG. 6 uses the digital latch 122 to record, but FIG. 7 uses a capacitor $C_G$ in company with a switch $SW_{SAMP}$, however. The falling-rate detector 130 in FIG. 7 has an altered current mirror 132, which acts as a normal current mirror to generate a tracking current equal to the corresponding current $I_2$ (=I(t)) when the switch $SW_{SAMP}$ is turned ON, conducting. Nevertheless, when the switch $SW_{SAMP}$ is turned OFF, not conducting, the capacitor $C_G$ holds the gate voltage of the PMOS transistor MP1, so that the current from PMOS transistor MP1 is held unchanged to be the sample current $I(t_{SAMP})$, where the $t_{SAMP}$ is the moment when the switch $SW_{SAMP}$ is switched from ON to OFF. A hold time $T_{HOLD}$ for this embodiment is a duration when the switch $SW_{SAMP}$ is OFF. According to the aforementioned teaching regarding to FIGS. 4 and 6, the falling-rate detector 130 in FIG. 7 is capable of detecting whether the falling rate $RA_{DROP}$ of the output voltage $V_{BUS}$ exceeds the predetermined rate $RA_{REF}$.

Figure 8:
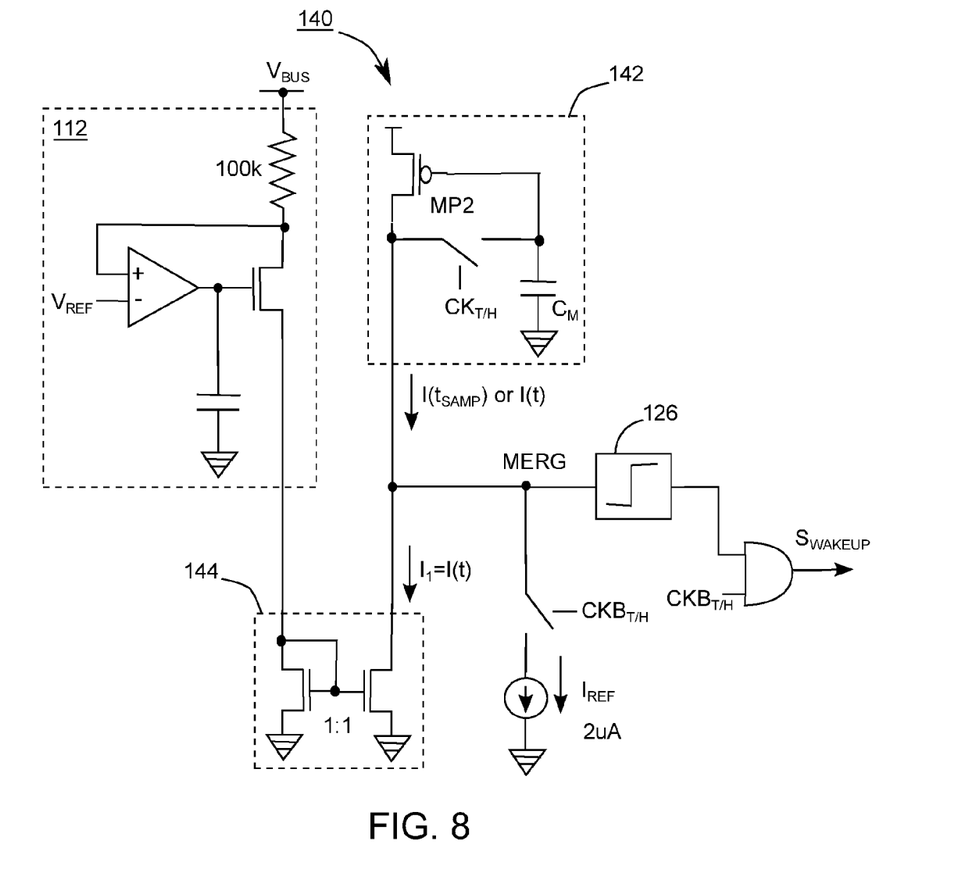

FIG. 8 demonstrates another falling-rate detector 140, suitable for being implemented inside the secondary-side control circuit 62 in embodiments of the invention, and capable of detecting whether the falling rate $RA_{DROP}$ of the output voltage $V_{BUS}$ exceeds the predetermined rate $RA_{REF}$. Some elements or circuits in FIG. 8 are not detailed herein and could be understandable based on the aforementioned teaching because they are the same as or similar with some elements or circuits in FIGS. 6 and 7. The voltage-to-current converter 112 and the current mirror 144 together generate the corresponding current I(t). When the track/hold clock $CK_{T/H}$ is asserted, the PMOS transistor outputs a tracking current equal to the corresponding current I(t). When the track/hold clock $CK_{T/H}$ is deasserted, the capacitor $C_M$ inside the recorder 142 holds the gate voltage of the PMOS transistor MP2, so that the current from the PMOS transistor MP2 becomes the sample current $I(t_{SAMP})$ and is held unchanged, where the $t_{SAMP}$ is the moment when the switch $SW_{SAMP}$ is switched from ON to OFF. When the track/hold clock $CK_{T/H}$ is deasserted, the sample current $I(t_{SAMP})$ is checked by the decider 126 to determine whether it exceeds the summation of the corresponding current I(t) and the reference current $I_{REF}$ where a hold time $T_{HOLD}$ for this embodiment is a duration when the track/hold clock $CK_{T/H}$ is deasserted. According to the aforementioned teaching regarding to FIGS. 4, 6 and 7, the falling-rate detector 140 in FIG. 8 is capable of detecting whether the falling rate $RA_{DROP}$ of the output voltage $V_{BUS}$ exceeds the predetermined rate $RA_{REF}$.

Several secondary-side control circuits according to some embodiments of the invention can sense whether the falling rate $RA_{REF}$, $RA_{DROP}$ of the output voltage $V_{BUS}$ exceeds the predetermined rate $RA_{REF}$, in response transfer information to a primary-side control circuit to fast start a new switching cycle, during which the primary-side control circuit is capable of sensing the output voltage $V_{BUS}$ for quick transient response. It is more advantageous that embodiments of the invention can prevent the output voltage $V_{BUS}$ from falling too low when a light load suddenly becomes a heavy load.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply with a primary side and a secondary side isolated from each other, the power supply comprising:
   a primary-side control circuit on the primary side, for controlling a power switch to convert an input power source on the primary side into an output power source on the secondary side, wherein the output power source has an output voltage; and
   a secondary-side control circuit on the secondary side, for detecting a falling rate of the output voltage and sending information to the primary-side control circuit when the falling rate exceeds a predetermined rate;
   wherein, in response to the information, the primary-side control circuit starts a new switching cycle of the power switch; and
   wherein the secondary-side control circuit comprises:
      a voltage-to-current converter for converting the output voltage into a corresponding current;
      a track-and-hold circuit for holding a sample current during a hold time, where the sample current equals to the corresponding current at the beginning of the hold time; and
      a decider for determining whether the sample current exceeds a summation of the corresponding current and a reference current during the hold time, so as to determine whether the falling rate exceeds the predetermined rate.

2. The power supply claimed in claim 1, wherein the voltage-to-current converter is one of first and second voltage-to-current converters, and the track-and-hold circuit is the other of the first and the second voltage-to-current converters.

3. The power supply claimed in claim 2, wherein the first voltage-to-current converter is controlled by a track/hold clock while the second voltage-to-current converter is controlled by an inverse of the track/hold clock.

4. The power supply claimed in claim 1, wherein the track-and-hold circuit comprises:
   an analog-to-digital converter for converting the corresponding current into a digital signal; and
   a first current generator controlled by the digital signal to generate the sample current.

5. The power supply claimed in claim 1, wherein the track-and-hold circuit comprises:
   a capacitor;
   a switch; and
   a transistor;
   wherein when the switch is turned OFF, the capacitor holds a control voltage of the transistor so the transistor outputs and holds the sample current, and when the switch is turned ON the transistor outputs a tracking current substantially equal to the corresponding current.

6. A power supply with a primary side and a secondary side isolated from each other, the power supply comprising:
   a primary-side control circuit on the primary side, for controlling a power switch to convert an input power source on the primary side into an output power source on the secondary side, wherein the output power source has an output voltage; and
   a secondary-side control circuit on the secondary side, for detecting a falling rate of the output voltage and sending information to the primary-side control circuit when the falling rate exceeds a predetermined rate;
   wherein, in response to the information, the primary-side control circuit starts a new switching cycle of the power switch;
   wherein the secondary-side control circuit further detects the output voltage, determines whether the output voltage is below a predetermined voltage, and determines whether the falling rate exceeds the predetermined rate only when the output voltage is below the predetermined voltage.

7. A power supply with a primary side and a secondary side isolated from each other, the power supply comprising:
   a primary-side control circuit on the primary side, for controlling a power switch to convert an input power source on the primary side into an output power source on the secondary side, wherein the output power source has an output voltage; and
   a secondary-side control circuit on the secondary side, for detecting a falling rate of the output voltage and sending information to the primary-side control circuit when the falling rate exceeds a predetermined rate;
   wherein, in response to the information, the primary-side control circuit starts a new switching cycle of the power switch;
   wherein the secondary-side control circuit further detects a switching frequency of a present switching cycle, determines whether the switching frequency is below a predetermined frequency, and determines whether the falling rate exceeds the predetermined rate only when the switching frequency is below the predetermined frequency.

8. A control method suitable for a switching mode power supply with a primary side and a secondary side isolated from each other, wherein the switching mode power supply converts an input power source on the primary side into an output power source on the secondary side, and the output power source has an output voltage, the control method comprising:
   converting the output voltage into a corresponding current;
   holding a sample current during a hold time, wherein the sample current is equal to the corresponding current at the beginning of the hold time;
   determining whether the sample current exceeds a summation of the corresponding current and a reference current; and
   sending information from the secondary side to the primary side if the sample current exceeds the summation.

9. The control method claimed in claim 8, further comprising:
   checking if a cycle time of the switching mode power supply exceeds a predetermined time period;
   wherein the step of determining is performed if the cycle time exceeds the predetermined time period.

10. The control method claimed in claim 8, wherein the switching mode power supply comprise a power switch operating with a switching cycle consisting of an ON time and an OFF time, the OFF time includes a de-energizing time and an idle time, and the hold time is within the idle time.

11. The control method claimed in claim 8, further comprising:
providing a transistor generating a tracking current equal to the corresponding current; and
holding a control voltage of the transistor during the hold time to make the tracking current become the sample current.

12. The control method claimed in claim 8, further comprising:
providing first and second voltage-to-current converters;
wherein the first voltage-to-current converter provides the sample current when the second voltage-to-current converter provides the corresponding current; and
the second voltage-to-current converter provides the sample current when the first voltage-to-current converter provides the corresponding current.

13. The control method claimed in claim 8, further comprising:
analog-to-digital converting the corresponding current into a digital signal; and
latching the digital signal to generate the sample current.

14. A secondary-side control circuit in a switching mode power supply with a primary side and a secondary side isolated from each other, wherein the switching mode power supply converts an input power source on the primary side into an output power source on the secondary side, and the output power source has an output voltage, the secondary-side control circuit is on the secondary side, comprising:
a voltage-to-current converter for converting the output voltage into a corresponding current;
a track-and-hold circuit for holding a sample current during a hold time, where the sample current equals to the corresponding current at the beginning of the hold time; and
a decider for determining whether the sample current exceeds a summation of the corresponding current and a reference current during the hold time, so as to determine whether a falling rate of the output voltage exceeds a predetermined rate.

15. The secondary-side control circuit of claim 14, wherein the voltage-to-current converter is one of first and second voltage-to-current converters, and the track-and-hold circuit is the other of the first and the second voltage-to-current converters.

16. The secondary-side control circuit of claim 14, wherein the track-and-hold circuit comprises:
an analog-to-digital converter for converting the corresponding current into a digital signal; and
a first current generator controlled by the digital signal to generate the sample current.

17. The secondary-side control circuit of claim 14, wherein the track-and-hold circuit comprises:
a capacitor;
a switch; and
a transistor;
wherein when the switch is turned OFF, the capacitor holds a control voltage of the transistor so the transistor outputs the sample current, and when the switch is turned ON the transistor outputs a tracking current substantially equal to the corresponding current.

* * * * *